(12) United States Patent
Donnellan et al.

(10) Patent No.: US 12,345,827 B2
(45) Date of Patent: Jul. 1, 2025

(54) SYSTEMS AND METHODS FOR PROVIDING OPTIMIZED NETWORK GEOFENCING

(71) Applicant: Verizon Patent and Licensing Inc., Basking Ridge, NJ (US)

(72) Inventors: Kevin Donnellan, North Brunswick, NJ (US); Manoj Monga, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 398 days.

(21) Appl. No.: 18/087,461

(22) Filed: Dec. 22, 2022

(65) Prior Publication Data
US 2024/0210511 A1    Jun. 27, 2024

(51) Int. Cl.
   G01S 5/00    (2006.01)
   G01S 5/02    (2010.01)
   H04W 64/00   (2009.01)

(52) U.S. Cl.
   CPC .......... G01S 5/0036 (2013.01); G01S 5/0278 (2013.01); H04W 64/00 (2013.01)

(58) Field of Classification Search
   CPC ..... G01S 5/0036; G01S 5/0278; H04W 64/00
   USPC ...................................... 455/456.1
   See application file for complete search history.

(56) References Cited

U.S. PATENT DOCUMENTS

| | | | | |
|---|---|---|---|---|
| 7,525,484 B2* | 4/2009 | Dupray | ................. | G01S 5/0009 342/450 |
| 8,155,666 B2* | 4/2012 | Alizadeh-Shabdiz | ....................... | H04W 64/00 455/456.2 |
| 8,554,246 B2* | 10/2013 | Boyer | ....................... | G01S 5/04 342/450 |
| 9,661,473 B1* | 5/2017 | Jarvis | ....................... | H04W 4/33 |
| 2003/0146871 A1* | 8/2003 | Karr | ....................... | G01S 5/0009 342/465 |
| 2005/0255854 A1* | 11/2005 | Sillasto | ................. | G01S 5/0263 455/456.2 |
| 2011/0182238 A1* | 7/2011 | Marshall | ............... | H04W 64/00 370/328 |

(Continued)

FOREIGN PATENT DOCUMENTS

| | | | | |
|---|---|---|---|---|
| CA | 2744873 A1 * | 5/2007 | ............. | G01S 19/14 |
| CA | 2816786 A1 * | 11/2013 | ............ | H04W 64/00 |

(Continued)

*Primary Examiner* — Mahendra R Patel

(57) ABSTRACT

A device may receive multiple location estimates, with uncertainties, for the user device based on determining that the uncertainty is greater than or equal to the uncertainty threshold, and may store the location estimate, the multiple location estimates, and the uncertainties in a data structure. The device may identify a greatest uncertainty of the uncertainties, and may remove, from the data structure, location estimates and uncertainties associated with the greatest uncertainty to generate a set of location estimates and a set of uncertainties. The device may calculate a set of weights based on the set of uncertainties, and may calculate a set of weighted location estimates based on the set of weights and the set of location estimates. The device may calculate a weighted average location of the user device based on the set of weighted location estimates, and may provide the weighted average location to the user device.

20 Claims, 10 Drawing Sheets

(56) References Cited

U.S. PATENT DOCUMENTS

| | | | |
|---|---|---|---|
| 2013/0029685 A1* | 1/2013 | Moshfeghi | H04W 4/021 |
| | | | 455/456.1 |
| 2013/0053056 A1* | 2/2013 | Aggarwal | H04W 64/00 |
| | | | 455/456.1 |
| 2016/0345286 A1* | 11/2016 | Jamieson | H04B 17/12 |
| 2018/0058856 A1* | 3/2018 | Catherall | H04W 48/04 |
| 2019/0178654 A1* | 6/2019 | Hare | G06T 7/70 |
| 2022/0128677 A1* | 4/2022 | Chowdhury | G01S 13/08 |

FOREIGN PATENT DOCUMENTS

| | | | | |
|---|---|---|---|---|
| CA | 2926705 C | * | 2/2020 | F16M 11/08 |
| WO | WO-2005111651 A1 | * | 11/2005 | G01S 5/0252 |
| WO | WO-2013108043 A2 | * | 7/2013 | G01S 5/0242 |
| WO | WO-2021207707 A2 | * | 10/2021 | G01C 21/3815 |
| WO | WO-2022234294 A1 | * | 11/2022 | G01S 5/0289 |

* cited by examiner

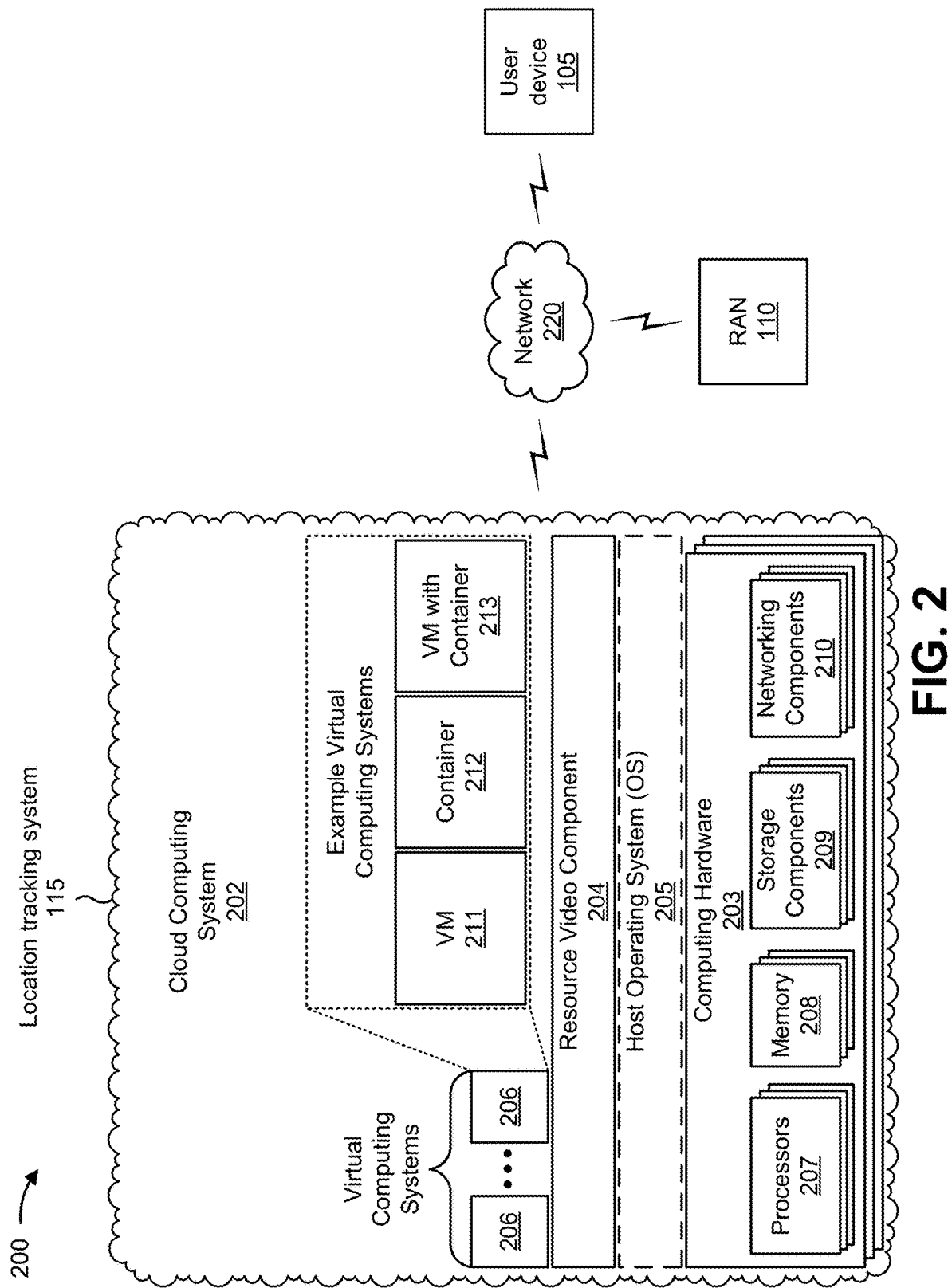

SYSTEMS AND METHODS FOR PROVIDING OPTIMIZED NETWORK GEOFENCING

BACKGROUND

Geofencing of devices has been used in many industries including transportation, retail, shipping, and/or the like. Models that use an estimate of a location of a device and compare the estimate to boundaries of a geofence have been developed across these industries.

BRIEF DESCRIPTION OF THE DRAWINGS

FIG. 2 is a diagram of an example environment in which systems and/or methods described herein may be implemented.

DETAILED DESCRIPTION OF EXAMPLE EMBODIMENTS

Figure 1A:
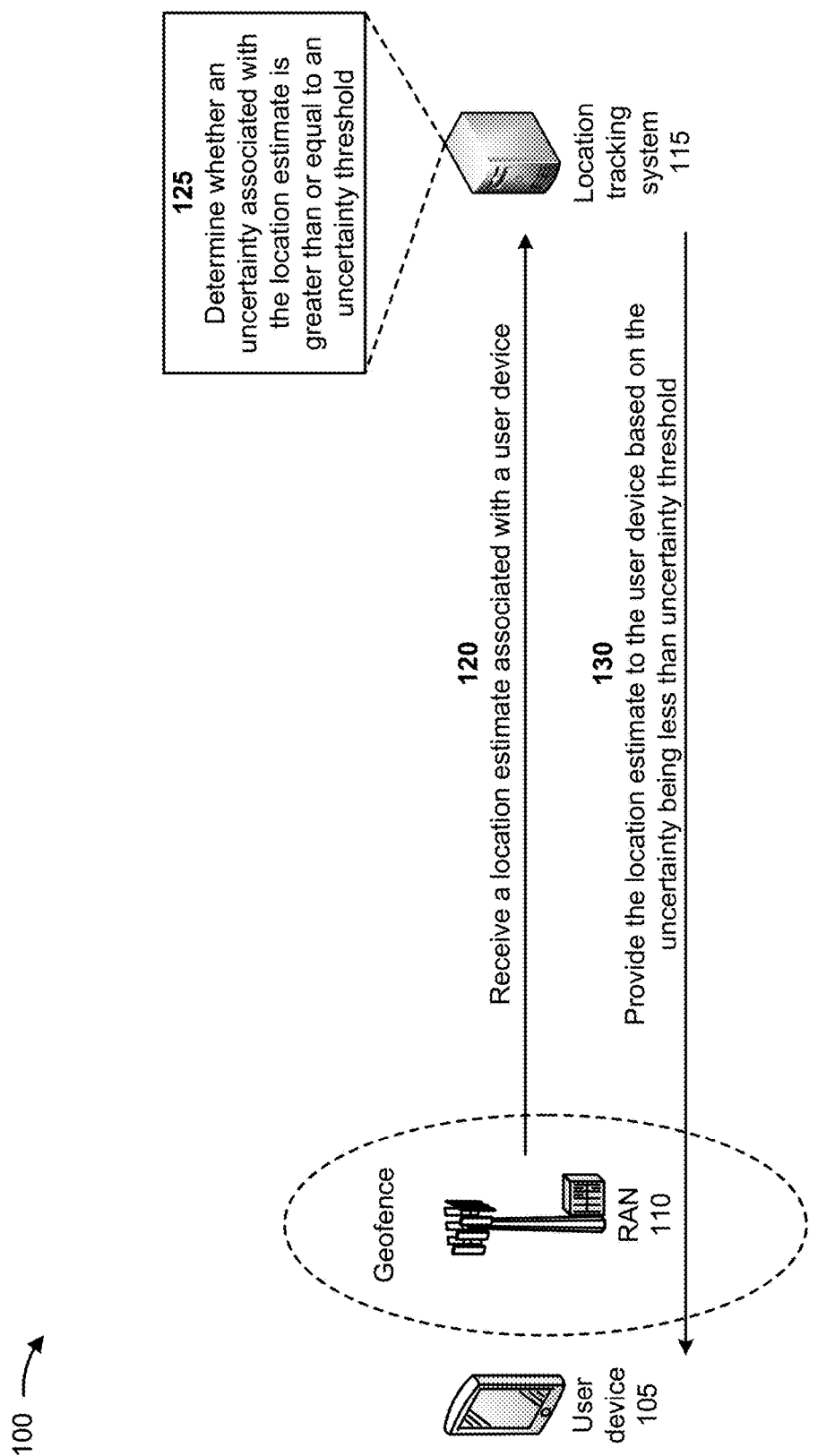
FIGS. 1A-1G are diagrams of an example associated with providing optimized network geofencing.

The following detailed description of example implementations refers to the accompanying drawings. The same reference numbers in different drawings may identify the same or similar elements.

A geofence is a virtual perimeter for a real-world geographic area. A geofence may be dynamically generated or match a predefined set of boundaries. The use of a geofence is called geofencing, and one example of its use includes a location-aware device of a location-based service user entering or exiting a geofence. A challenge for establishing a geofence for a user device (e.g., a mobile telephone) is computing an estimated location of the user device across different geographic scenarios that span location technology capabilities. For example, a user device may utilize a global positioning system (GPS) receiver but may be located inside a building where GPS is unavailable. Thus, another location technology may be needed to locate the user device indoors. Another challenge of locating a user device for a geofence is the cost of adding location technologies such as GPS, Wi-Fi, or beaconing may be cost prohibitive for a network and/or the user device. For example, a cost may be associated with integrating hardware and firmware on the user device as well as deploying infrastructure in locations where the user device is utilized. Yet another challenge of locating a user device that spans diverse geographic areas is the complexity of software needed to utilize the technologies. Often, a special application must be installed on the user device to implement the geofence. For a battery-operated user device an additional challenge is to keep the battery consumption of location technologies low so the battery may last longer. Thus, current techniques for geofencing a user device consume computing resources (e.g., processing resources, memory resources, communication resources, and/or the like), networking resources, and/or other resources associated with quickly depleting a battery of a user device, installing location technology software on the user device, deploying infrastructure for location technologies for the user device, providing a variety of location technologies for the user device, and/or the like.

Some implementations described herein provide a location tracking system that provides optimized network geofencing. For example, the location tracking system may receive a location estimate associated with a user device, and may determine whether an uncertainty associated with the location estimate is greater than or equal to an uncertainty threshold. The location tracking system may cause multiple location requests to be provided to the user device based on determining that the uncertainty is greater than or equal to the uncertainty threshold, and may receive multiple location estimates, with uncertainties, for the user device based on causing the multiple location requests to be provided to the user device. The location tracking system may store the location estimate, the multiple location estimates, and the uncertainties in a data structure, and may identify the greatest uncertainty of the uncertainties. The location tracking system may remove, from the data structure, one or more location estimates and uncertainties associated with the greatest uncertainty to generate a set of location estimates and a set of uncertainties, and may calculate a set of weights based on the set of uncertainties. The location tracking system may calculate a set of weighted location estimates based on the set of weights and the set of location estimates, and may calculate a weighted average location of the user device based on the set of weighted location estimates. The location tracking system may provide the weighted average location to the user device.

In this way, the location tracking system provides optimized network geofencing. For example, the location tracking system may be utilized with a class of user devices where network connectivity is desired, cost prohibits a quantity of location technologies, a battery impact from geofencing is low, and there are constraints on supporting an application for geofencing. The location tracking system may utilize network (e.g., cellular network) based location technologies, such as cell identifier (CID) based location, enhanced cell identifier (eCID) based location, observed time difference of arrival (OTDOA) based location, multi-round trip time based location, multi-cell angle of arrival based location, multi-cell angle of departure based location, downlink time difference of arrival based location, and/or the like. The network based location technologies may yield low battery consumption, with no additional hardware cost for a user device and no application required for the user device. The location tracking system may estimate an accuracy of the network based location technologies with an uncertainty measurement that is provided with a location estimate. Thus, the location tracking system may conserve computing resources, networking resources, and/or other resources that would have otherwise been consumed by quickly depleting a battery of a user device, installing location technology software on the user device, deploying infrastructure for location technologies for the user device, providing a variety of location technologies for the user device, and/or the like.

FIGS. 1A-1G are diagrams of an example 100 associated with providing optimized network geofencing. As shown in FIGS. 1A-1G, example 100 includes a user device 105 associated with a radio access network (RAN) 110 and a location tracking system 115. The location tracking system 115 may include a system that provides optimized network geofencing. Further details of the user device 105, the RAN 110, and the location tracking system 115 are provided elsewhere herein. Although implementations described herein depict a single user device 105 and RAN 110, in some implementations, the location tracking system 115 may be associated with multiple user devices 105 and/or multiple RANs 110.

As shown in FIG. 1A, and by reference number 120, the location tracking system 115 may receive a location estimate associated with the user device 105. For example, the RAN 110 (e.g., a network device) may generate a geofence that may be utilized to determine a location of the user device 105. The geofence is a virtual perimeter for a real-world geographic area. The geofence may be dynamically generated or match a predefined set of boundaries. The use of a geofence is called geofencing, and one example of its use includes a location-aware device of a location-based service user entering or exiting a geofence. When the user device 105 is in or near the geofence, the RAN 110 may receive a location estimate associated with a location of the user device 105. The RAN 110 may provide the location estimate to the location tracking system 115, and the location tracking system 115 may receive the location estimate from the RAN 110.

As further shown in FIG. 1A, and by reference number 125, the location tracking system 115 may determine whether an uncertainty associated with the location estimate is greater than or equal to an uncertainty threshold. For example, the location tracking system 115 may define the uncertainty threshold to include a value below which a location estimate may be valid and utilized without obtaining multiple (e.g., burst) location estimates or measurements. The location estimate may be associated with an uncertainty that is determined by the RAN 110 and provided to the location tracking system 115 with the location estimate. The location tracking system 115 may determine whether the uncertainty associated with the location estimate is greater than or equal to the defined uncertainty threshold. In some implementations, the location tracking system 115 may determine that the uncertainty associated with the location estimate is less than the uncertainty threshold. Alternatively, the location tracking system 115 may determine that the uncertainty associated with the location estimate is greater than or equal to the uncertainty threshold.

As further shown in FIG. 1A, and by reference number 130, the location tracking system 115 may provide the location estimate to the user device 105 based on the uncertainty being less than uncertainty threshold. For example, when the location tracking system 115 determines that the uncertainty associated with the location estimate is less than the uncertainty threshold, the location tracking system 115 may determine that the location estimate is a valid estimate of the location of the user device 105. Accordingly, the location tracking system 115 may provide the location estimate to the user device 105, and the user device 105 may receive the location estimate. The user device 105 may utilize the location estimate to perform one or more location-based functions.

Figure 1B:
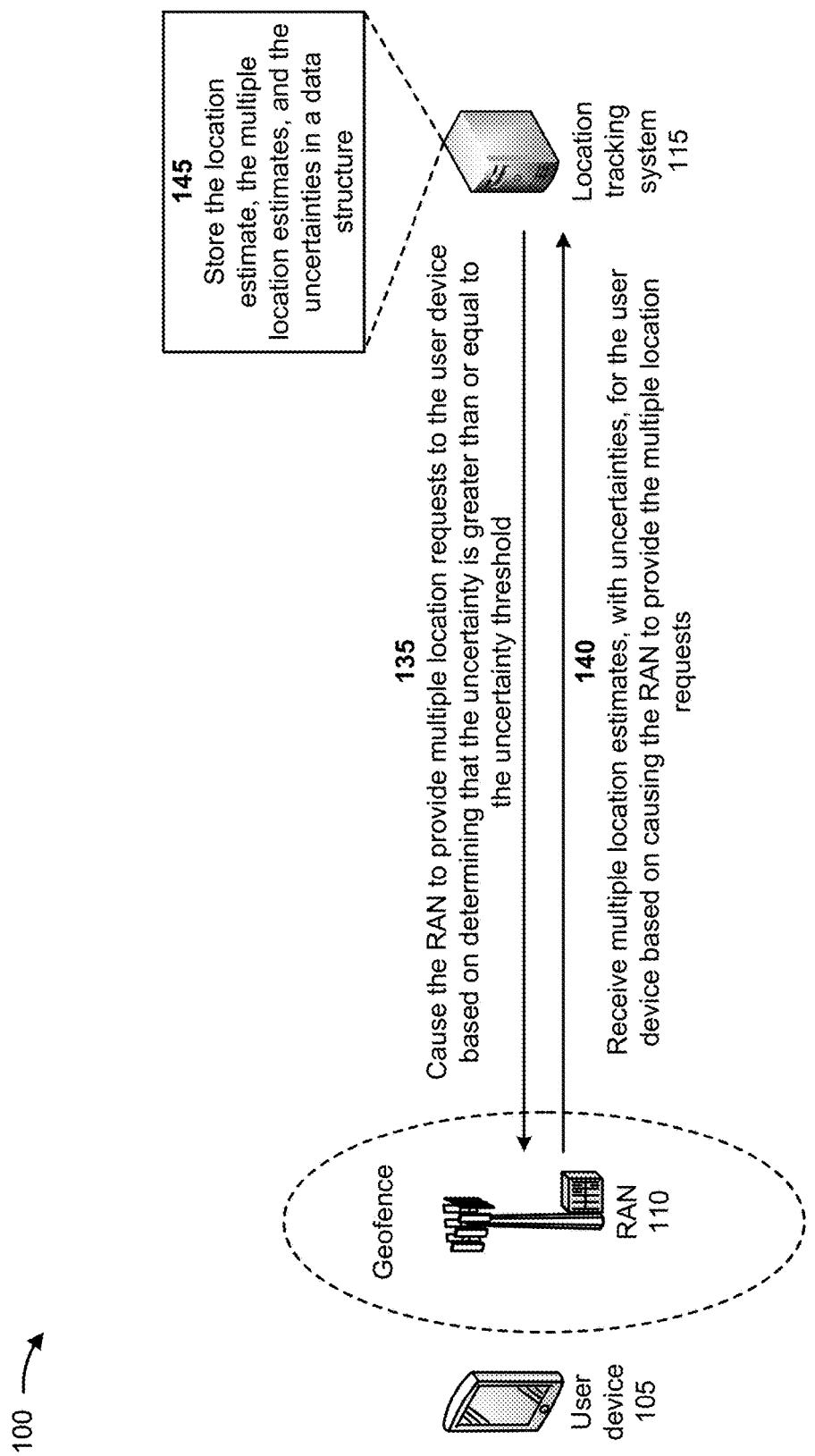

As shown in FIG. 1B, and by reference number 135, the location tracking system 115 may cause the RAN 110 to provide multiple location requests to the user device 105 based on determining that the uncertainty is greater than or equal to the uncertainty threshold. For example, when the location tracking system 115 determines that the uncertainty associated with the location estimate is greater than or equal to the uncertainty threshold, the location tracking system 115 may determine that the location estimate is an invalid estimate of the location of the user device 105. Accordingly, the location tracking system 115 may improve a geofence accuracy of the user device 105 by causing a rapid burst of location estimates (e.g., multiple location estimates) to be generated when the user device 105 is near a geofence boundary. The rapid burst of location estimates may be generated based on the location tracking system 115 causing the RAN 110 to provide multiple location requests to the user device 105. By receiving multiple location estimates, the location tracking system 115 may improve an accuracy of a location estimate for the user device 105 by averaging or filtering out less accurate location estimates and averaging more accurate location estimates.

In some implementations, when causing the multiple location requests to be provided to the user device 105 based on determining that the uncertainty is greater than or equal to the uncertainty threshold, the location tracking system 115 may determine a quantity of the multiple location requests to be provided to the user device 105 based on determining that the uncertainty is greater than or equal to the uncertainty threshold. The location tracking system 115 may provide, to the RAN 110, instructions to cause the RAN 110 device to provide the quantity of the multiple location requests to the user device 105. The user device 105 may receive the multiple location requests from the RAN 110, and may generate multiple location estimates based on the multiple location requests. The user device 105 may provide the multiple location estimates to the RAN 110, and the RAN 110 may receive the multiple location estimates.

As further shown in FIG. 1B, and by reference number 140, the location tracking system 115 may receive multiple location estimates, with uncertainties, for the user device 105 based on causing the RAN 110 to provide the multiple location requests. For example, when the RAN 110 receives the multiple location estimates from the user device 105, the RAN 110 may calculate uncertainties associated with the multiple location estimates. The RAN 110 may provide, to the location tracking system 115, the multiple location estimates for the user device 105 and the uncertainties associated with the multiple location estimates. The location tracking system 115 may receive the multiple location estimates and the associated uncertainties from the RAN 110.

As further shown in FIG. 1B, and by reference number 145, the location tracking system 115 may store the location estimate, the multiple location estimates, and the uncertainties in a data structure. For example, the location tracking system 115 may be associated with a data structure (e.g., database, a table, a list, and/or the like). The location tracking system 115 may store the location estimate, the multiple location estimates, and the uncertainties (e.g., including the uncertainty associated with the location estimate) in the data structure for further processing.

Figure 1C:
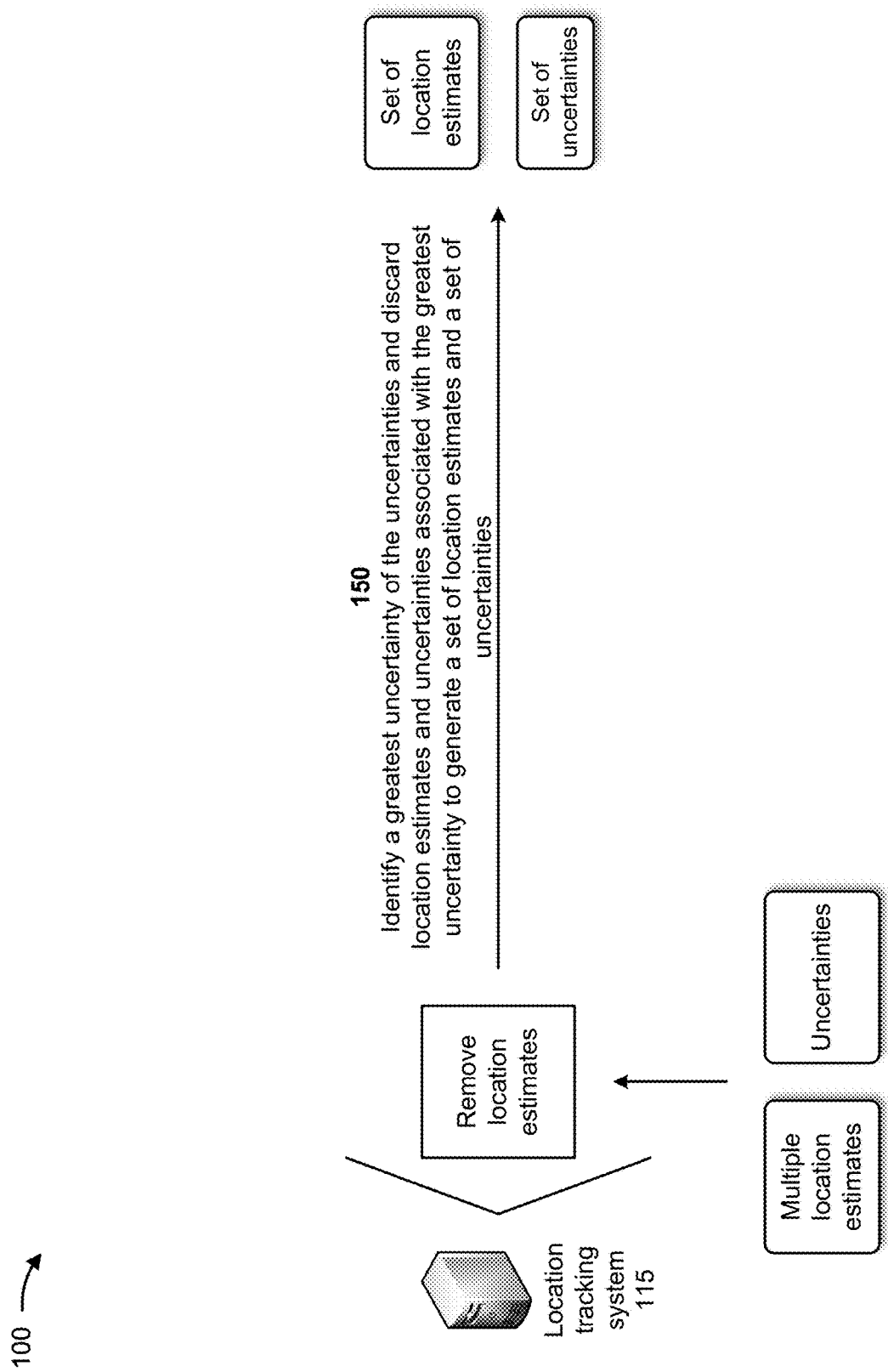

As shown in FIG. 1C, and by reference number 150, the location tracking system 115 may identify a greatest uncertainty of the uncertainties and may discard location estimates and uncertainties associated with the greatest uncertainty to generate a set of location estimates and a set of uncertainties. For example, the location tracking system 115 may numerically rank the uncertainties associated with the location estimate and the multiple location estimates, and may identify a greatest uncertainty of the uncertainties based on numerically ranking the uncertainties. The location tracking system 115 may identify one or more uncertainties associated with the greatest uncertainty, and may identify one or more corresponding location estimates associated with the one or more uncertainties. The location tracking system 115 may discard (e.g., remove from the data structure) the identified one or more uncertainties and the identified one or more corresponding location estimates associated with the one or more uncertainties. After removal of the identified one or more uncertainties and the identified one or more corresponding location estimates, the data structure may include a set of location estimates associated with a set of uncertainties (e.g., each of which is less than the greatest uncertainty).

Figure 1D:
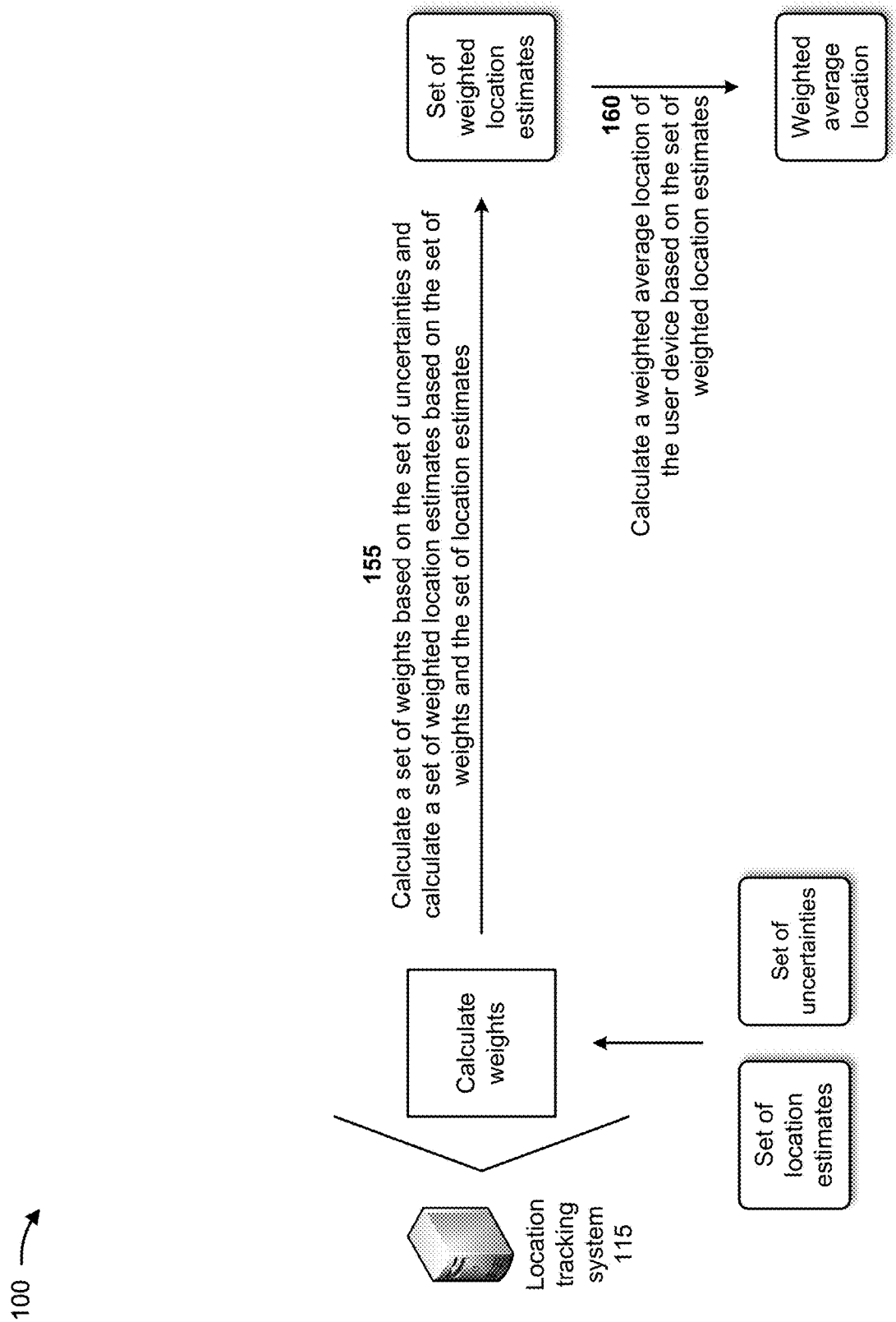

As shown in FIG. 1D, and by reference number 155, the location tracking system 115 may calculate a set of weights based on the set of uncertainties and calculate a set of weighted location estimates based on the set of weights and the set of location estimates. For example, the location tracking system 115 may convert the set of uncertainties to the set of weights. In some implementations, when calculating the set of weights based on the set of uncertainties, the location tracking system 115 may calculate a reciprocal for each uncertainty of the set of uncertainties to generate a set of reciprocals that correspond to the set of weights. In some implementations, each of the set of weights may be larger when a corresponding one of the set of uncertainties is smaller, and each of the set of weights may be smaller when a corresponding one of the set of uncertainties is larger.

In some implementations, the location tracking system 115 may utilize the set of weights and the set of location estimates to calculate the set of weighted location estimates. For example, the location tracking system 115 may multiply each weight of the set of weights with a correspond location estimate of the set of location estimates. In some implementations, when calculating the set of weighted location estimates based on the set of weights and the set of location estimates, the location tracking system 115 may add values of the set of weights to obtain a total value. The location tracking system 115 may multiply weights, of the set of weights, and corresponding location estimates, of the set of location estimates, to generate a set of values, and may divide each of the set of values by the total value to calculate the set of weighted location estimates.

As further shown in FIG. 1D, and by reference number 160, the location tracking system 115 may calculate a weighted average location of the user device 105 based on the set of weighted location estimates. For example, the location tracking system 115 may add the set of weighted location estimates to calculate the weighted average location of the user device 105. In some implementations, the location tracking system 115 may add the set of weighted location estimates to generate a value, and may divide the value by a quantity of weighted location estimates, in the set of weighted location estimates, to calculate the weighted average location of the user device 105. In some implementations, when calculating the weighted average location of the user device 105 based on the set of weighted location estimates, the location tracking system 115 may calculate a weighted average latitude based on the set of weighted location estimates. The location tracking system 115 may calculate a weighted average longitude based on the set of weighted location estimates, and may calculate the weighted average location of the user device based on the weighted average latitude and the weighted average longitude.

Figure 1E:
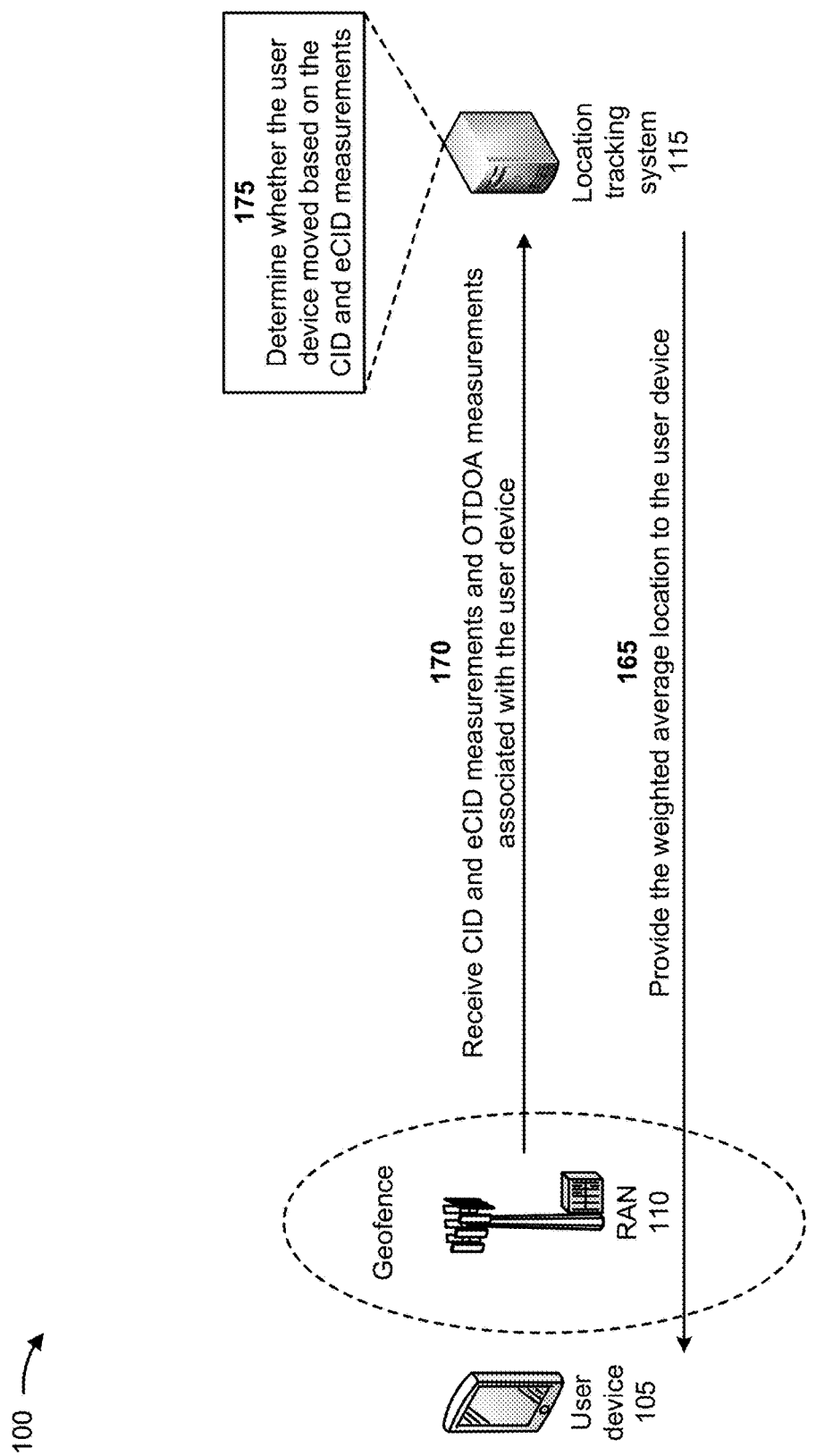

As shown in FIG. 1E, and by reference number 165, the location tracking system 115 may provide the weighted average location to the user device 105. For example, after the location tracking system 115 calculates the weighted average location of the user device 105, the location tracking system 115 may provide the weighted average location to the user device 105, and the user device 105 may receive the weighted average location. The user device 105 may utilize the weighted average location to perform one or more location-based functions.

As further shown in FIG. 1E, and by reference number 170, the location tracking system 115 may receive CID and eCID measurements and OTDOA measurements associated with the user device 105. For example, the RAN 110 may calculate repeated location measurements, associated with the user device 105, over time, such as CID and eCID measurements and OTDOA measurements associated with the user device 105. The RAN 110 may continuously provide the CID and eCID measurements and OTDOA measurements to the location tracking system 115, may periodically provide the CID and eCID measurements and OTDOA measurements to the location tracking system 115, may provide the CID and eCID measurements and OTDOA measurements to the location tracking system 115 based on requests received from the location tracking system 115, and/or the like. The location tracking system 115 may receive CID and eCID measurements and OTDOA measurements from the RAN 110.

As further shown in FIG. 1E, and by reference number 175, the location tracking system 115 may determine whether the user device 105 moved based on the CID and eCID measurements. For example, the location tracking system 115 may utilize the CID and eCID measurements to determine whether the user device 105 has moved to new location. CID and eCID measurements may indicate a same location estimate if the user device 105 has not moved a significant distance relative to the geofence. In some implementations, if the CID and/or eCID measurements have not changed for a same serving cell (e.g., the RAN 110), the location tracking system 115 may determine that the user device 105 has not moved. The location tracking system 115 may utilize such information as a check against other methods that may erroneously indicated significant movement of the user device 105.

Figure 1F:
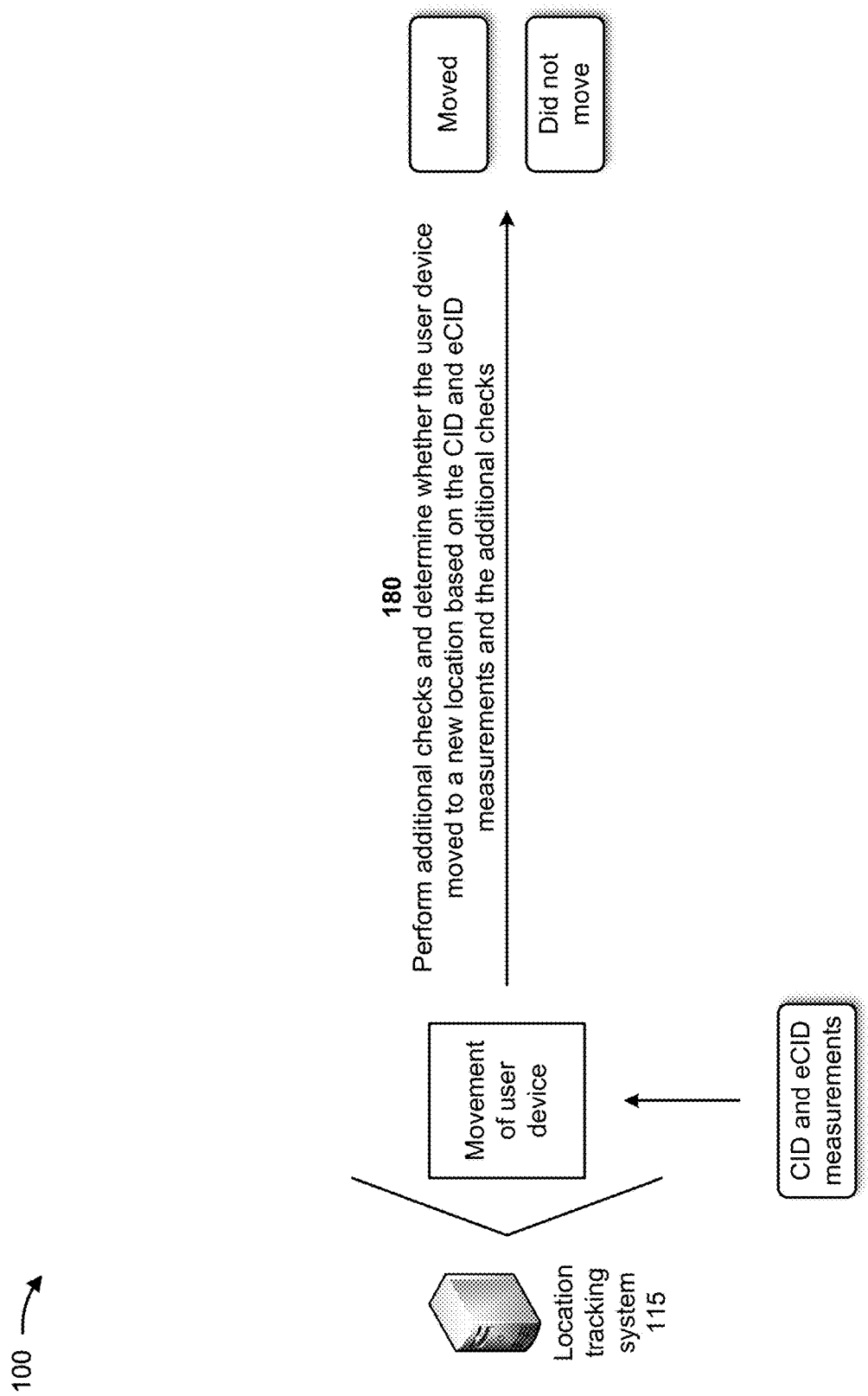

As shown in FIG. 1F, and by reference number 180, the location tracking system 115 may perform additional checks and may determine whether the user device 105 moved to a new location based on the CID and eCID measurements and the additional checks. For example, the location tracking system 115 may perform additional checks associated with the user device 105, and may determine, based on the CID and eCID measurements and the additional checks, whether the user device 105 moved to a new location. In some implementations, the CID and eCID measurements may indicate a large estimate change when the user device 105 changes serving cells (e.g., RANs 110), even though the user device 105 has not physically moved or not moved significantly relative to the geofence. If repeated CID and/or eCID measurements indicate the same location, and another set of repeated CID and eCID measurements indicate a new location with a new serving cell, the new location can be considered a movement. In such instances, the location tracking system 115 may perform an additional check to determine whether a new location estimate at the new location has a higher uncertainty than an original estimate and whether the new uncertainty covers a previous location estimate. In this case, the location tracking system 115 may determine that the user device 105 did not move significantly.

The location tracking system 115 may perform an additional check to determine whether a time for the user device to move from an old location to the new location is within speed capabilities of the user device 105. If the distance is not within the speed capabilities of the user device, the location tracking system 115 may average the locations or may obtain new measurements. If the new repeated CID and eCID measurements indicate the same new location and repeated CID and eCID measurements from an old cell indicated a common location, the location tracking system 115 may determine that the user device 105 is not moving and just changed serving cells.

Figure 1G:
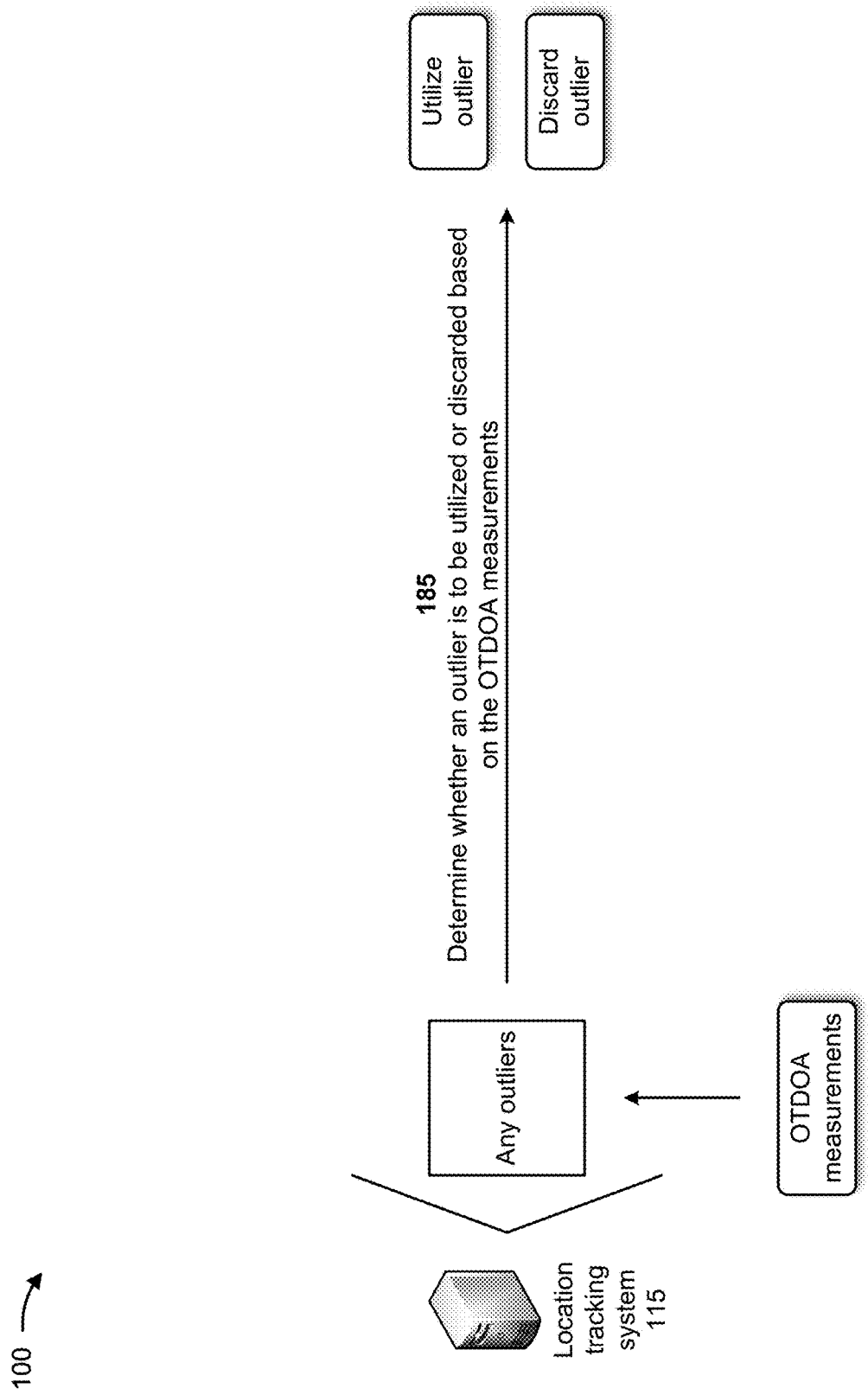

In some implementations, when performing the additional checks, the location tracking system 115 may determine whether a new location estimate at the new location has a greater uncertainty than an original location estimate at an original location, may determine whether a time associated with the user device moving from an original location to the new location is feasible, may determine whether the user device changed serving cells, and/or the like As shown in FIG. 1G, and by reference number 185, the location tracking system 115 may determine whether an outlier is to be utilized or discarded based on the OTDOA measurements. For example, the location tracking system 115 may receive the OTDOA measurements associated with the user device 105, and may determine whether an outlier is to be utilized or discarded based on the OTDOA measurements. In some implementations, the location tracking system 115 may discard an outlier based on the user device 105 being associated with common serving cells.

Repeated OTDOA measurements may provide different location estimates with a certain radius. This may be true if the OTDOA measurements are performed with a same set of neighbor cells. Occasional outlier location measurements may occur due to the nature of technology, such as cellular signal fading or temporary obstructions such as a truck passing by the user device 105. If repeated OTDOA measurements are done and a certain measurement is an outlier compared to the other measurements and the neighbor cells are the same or mostly the same, the location tracking system 115 may discard the outlier measurement. If repeated OTDOA measurements are done and a certain measurement is an outlier compared to the other measurements and the neighbor cells are not the same or not mostly the same, the location tracking system 115 may utilize the outlier measurement. The location tracking system 115 may average the outlier measurement with the other measurements if the outlier measurement occurs in a time between the other measurements. If the outlier measurement occurs at the end of the repeated measurements, additional measurements can be made to determine if the new location from the outlier signifies movement of the user device 105 to a new location.

In this way, the location tracking system 115 provides optimized network geofencing. For example, the location tracking system 115 may be utilized with a class of user devices 105 where network connectivity is desired, cost prohibits a quantity of location technologies, a battery impact from geofencing is low, and there are constraints on supporting an application for geofencing. The location tracking system 115 may utilize network based location technologies, such as CID based location, eCID based location, OTDOA based location, multi-round trip time based location, multi-cell angle of arrival based location, multi-cell angle of departure based location, downlink time difference of arrival based location, and/or the like. The network based location technologies may yield low battery consumption, with no additional hardware cost for a user device 105 and no application required for the user device 105. The location tracking system 115 may estimate an accuracy of the network based location technologies with an uncertainty measurement that is provided with a location estimate. Thus, the location tracking system 115 may conserve computing resources, networking resources, and/or other resources that would have otherwise been consumed by quickly depleting a battery of a user device 105, installing location technology software on the user device 105, deploying infrastructure for location technologies for the user device 105, providing a variety of location technologies for the user device 105, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

FIG. 2 is a diagram of an example environment 200 in which systems and/or methods described herein may be implemented. As shown in FIG. 2, the environment 200 may include the location tracking system 115, which may include one or more elements of and/or may execute within a cloud computing system 202. The cloud computing system 202 may include one or more elements 203-213, as described in more detail below. As further shown in FIG. 2, the environment 200 may include the user device 105, the RAN 110, and/or a network 220. Devices and/or elements of the environment 200 may interconnect via wired connections and/or wireless connections.

The user device 105 may include one or more devices capable of receiving, generating, storing, processing, and/or providing information, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. In some implementations, the user device 105 may include a battery operated wearable device that supports geofencing across diverse geographies, where the geofence lasting more than a day on one battery charge; a low cost tracking device that can be attached to another device or embedded in the device for the purpose of location and geofencing, which lasts many months on one battery charge; and/or the like.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the user device 105. The RAN 110 may transfer traffic between the user device 105 (e.g., using a cellular RAT), one or more base stations (e.g., using a wireless interface or a backhaul interface, such as a wired backhaul interface), and/or a core network. The RAN 110 may provide one or more cells that cover geographic areas.

In some implementations, the RAN 110 may perform scheduling and/or resource management for the user device 105 covered by the RAN 110 (e.g., the user device 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the user device 105 covered by the RAN 110).

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the location tracking system 115 may include one or more elements 203-213 of the cloud computing system 202, may execute within the cloud computing system 202, and/or may be hosted within the cloud computing system 202, in some implementations, the location tracking system 115 may not be cloud-based (e.g., may be implemented outside of a cloud computing system) or may be partially cloud-based. For example, the location tracking system 115 may include one or more devices that are not part of the cloud computing system 202, such as a device 300 of FIG. 3, which may include a standalone server or another type of computing device. The location tracking system 115 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
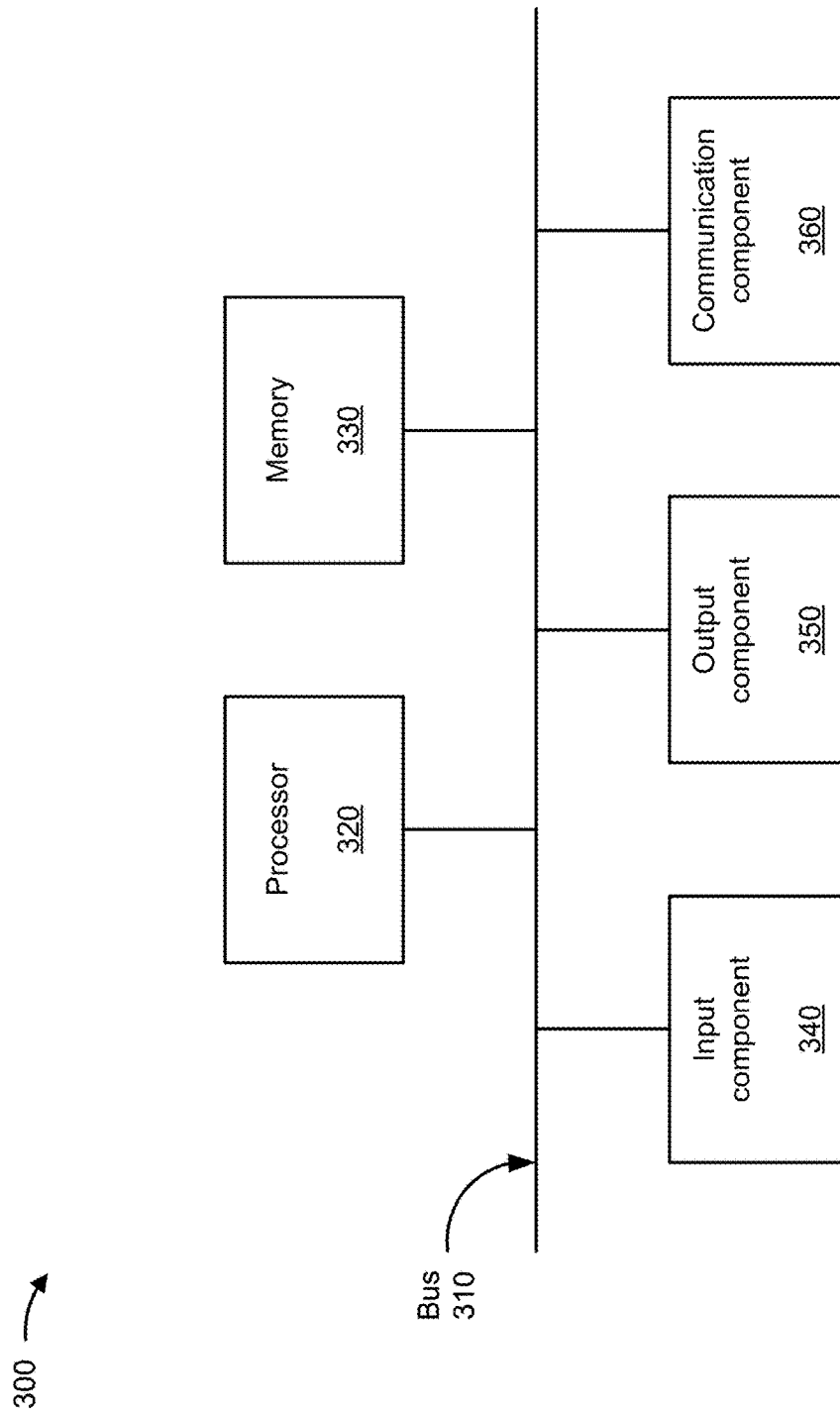
FIG. 3 is a diagram of example components of one or more devices of FIG. 2.

FIG. 3 is a diagram of example components of a device 300, which may correspond to the user device 105, the RAN 110, and/or the location tracking system 115. In some implementations, the user device 105, the RAN 110, and/or the location tracking system 115 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
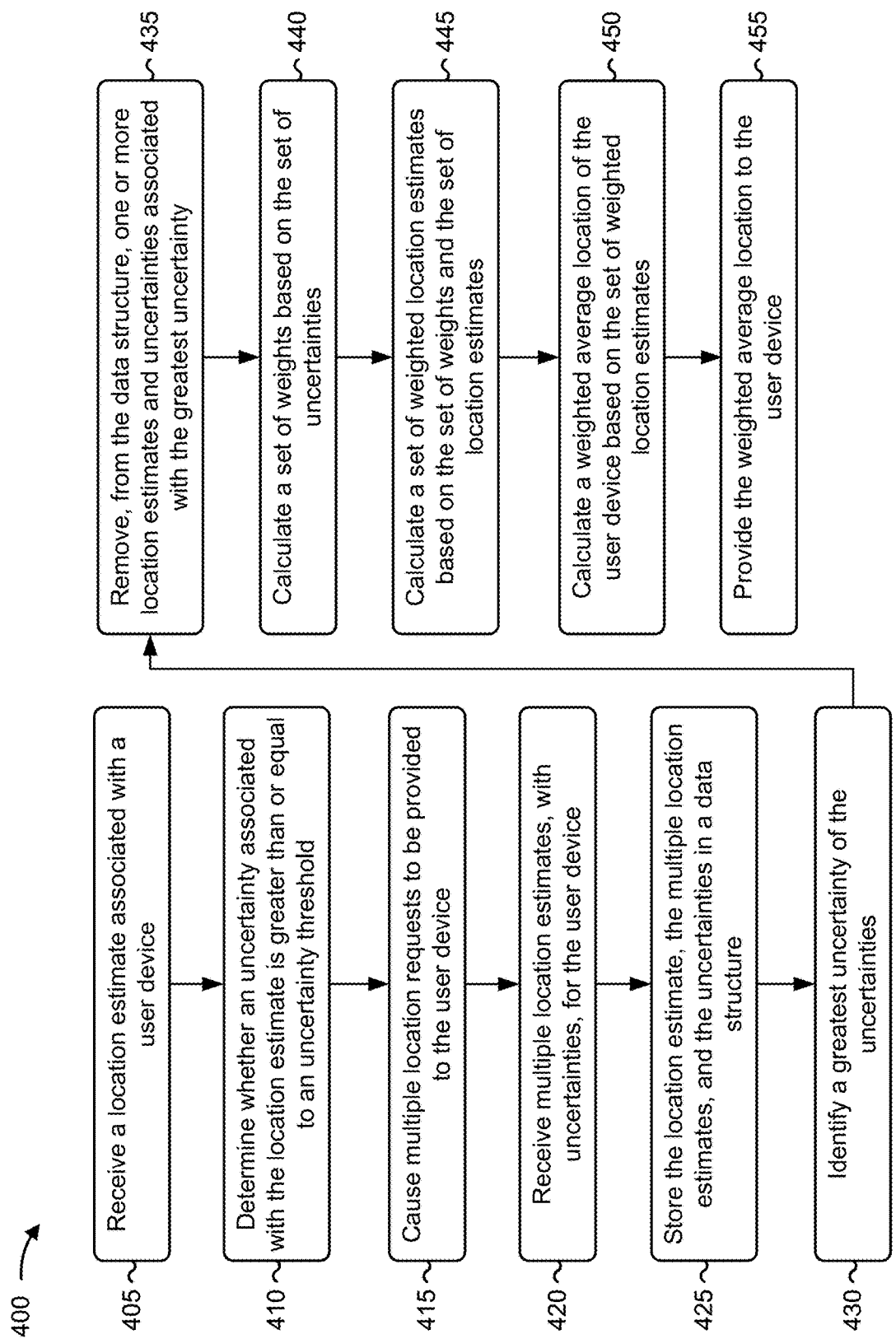
FIG. 4 is a flowchart of an example process for providing optimized network geofencing.

FIG. 4 depicts a flowchart of an example process 400 for providing optimized network geofencing. In some implementations, one or more process blocks of FIG. 4 may be performed by a device (e.g., the location tracking system 115). In some implementations, one or more process blocks of FIG. 4 may be performed by another device or a group of devices separate from or including the device, such as a RAN (e.g., the RAN 110). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving a location estimate associated with a user device (block 405). For example, the device may receive a location estimate associated with a user device, as described above.

As further shown in FIG. 4, process 400 may include determining whether an uncertainty associated with the location estimate is greater than or equal to an uncertainty threshold (block 410). For example, the device may determine whether an uncertainty associated with the location estimate is greater than or equal to an uncertainty threshold, as described above.

As further shown in FIG. 4, process 400 may include causing multiple location requests to be provided to the user device (block 415). For example, the device may cause multiple location requests to be provided to the user device based on determining that the uncertainty is greater than or equal to the uncertainty threshold, as described above. In some implementations, causing the multiple location requests to be provided to the user device based on determining that the uncertainty is greater than or equal to the uncertainty threshold includes determining a quantity of the multiple location requests to be provided to the user device based on determining that the uncertainty is greater than or equal to the uncertainty threshold; and providing, to a network device, instructions to cause the network device to provide the quantity of the multiple location requests to the user device. In some implementations, the multiple location estimates, with the uncertainties, are generated by the user device and received, by the device, from the network device.

As further shown in FIG. 4, process 400 may include receiving multiple location estimates, with uncertainties, for the user device (block 420). For example, the device may receive multiple location estimates, with uncertainties, for the user device based on causing the multiple location requests to be provided to the user device, as described above.

As further shown in FIG. 4, process 400 may include storing the location estimate, the multiple location estimates, and the uncertainties in a data structure (block 425). For example, the device may store the location estimate, the multiple location estimates, and the uncertainties in a data structure, as described above.

As further shown in FIG. 4, process 400 may include identifying a greatest uncertainty of the uncertainties (block 430). For example, the device may identify a greatest uncertainty of the uncertainties, as described above.

As further shown in FIG. 4, process 400 may include removing, from the data structure, one or more location estimates and uncertainties associated with the greatest uncertainty (block 435). For example, the device may remove, from the data structure, one or more location estimates and uncertainties associated with the greatest uncertainty to generate a set of location estimates and a set of uncertainties, as described above.

As further shown in FIG. 4, process 400 may include calculating a set of weights based on the set of uncertainties (block 440). For example, the device may calculate a set of weights based on the set of uncertainties, as described above. In some implementations, each of the set of weights is larger when a corresponding one of the set of uncertainties is smaller and each of the set of weights is smaller when a corresponding one of the set of uncertainties is larger. In some implementations, calculating the set of weights based on the set of uncertainties includes calculating a reciprocal for each uncertainty of the set of uncertainties to generate a set of reciprocals, wherein the set of reciprocals corresponds to the set of weights.

As further shown in FIG. 4, process 400 may include calculating a set of weighted location estimates based on the set of weights and the set of location estimates (block 445). For example, the device may calculate a set of weighted location estimates based on the set of weights and the set of location estimates, as described above. In some implementations, calculating the set of weighted location estimates based on the set of weights and the set of location estimates includes adding values of the set of weights to obtain a total value; multiplying weights, of the set of weights, and corresponding location estimates, of the set of location estimates, to generate a set of values; and dividing each of the set of values by the total value to calculate the set of weighted location estimates.

As further shown in FIG. 4, process 400 may include calculating a weighted average location of the user device based on the set of weighted location estimates (block 450). For example, the device may calculate a weighted average location of the user device based on the set of weighted location estimates, as described above. In some implementations, calculating the weighted average location of the user device based on the set of weighted location estimates includes calculating a weighted average latitude based on the set of weighted location estimates, calculating a weighted average longitude based on the set of weighted location estimates, and calculating the weighted average location of the user device based on the weighted average latitude and the weighted average longitude.

As further shown in FIG. 4, process 400 may include providing the weighted average location to the user device (block 455). For example, the device may provide the weighted average location to the user device, as described above.

In some implementations, process 400 includes providing the location estimate to the user device based on the uncertainty being less than uncertainty threshold.

In some implementations, process 400 includes receiving cell identifier and enhanced cell identifier measurements associated with the user device, and determining, based on the cell identifier and enhanced cell identifier measurements, whether the user device moved.

In some implementations, process 400 includes receiving cell identifier and enhanced cell identifier measurements associated with the user device, performing additional checks associated with the user device, and determining, based on the cell identifier and enhanced cell identifier measurements and the additional checks, whether the user device moved to a new location. In some implementations, performing the additional checks includes one or more of determining whether a new location estimate at the new location has a greater uncertainty than an original location estimate at an original location, determining whether a time associated with the user device moving from an original location to the new location is feasible, or determining whether the user device changed serving cells.

In some implementations, process 400 includes receiving observed time difference of arrival measurements associated with the user device, and determining whether an outlier is to be utilized or discarded based on the observed time difference of arrival measurements. In some implementations, the outlier is to be discarded based on the user device being associated with common serving cells.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, a location estimate associated with a user device;
   determining, by the device, whether an uncertainty associated with the location estimate is greater than or equal to an uncertainty threshold;
   causing, by the device, multiple location requests to be provided to the user device based on determining that the uncertainty is greater than or equal to the uncertainty threshold;
   receiving, by the device, multiple location estimates, with uncertainties, for the user device based on causing the multiple location requests to be provided to the user device;
   storing, by the device, the location estimate, the multiple location estimates, and the uncertainties in a data structure;
   identifying, by the device, a greatest uncertainty of the uncertainties;
   removing, by the device and from the data structure, one or more location estimates and uncertainties associated with the greatest uncertainty to generate a set of location estimates and a set of uncertainties;
   calculating, by the device, a set of weights based on the set of uncertainties;
   calculating, by the device, a set of weighted location estimates based on the set of weights and the set of location estimates;
   calculating, by the device, a weighted average location of the user device based on the set of weighted location estimates; and
   providing, by the device, the weighted average location to the user device.

2. The method of claim 1, further comprising:
   providing the location estimate to the user device based on the uncertainty being less than uncertainty threshold.

3. The method of claim 1, wherein causing the multiple location requests to be provided to the user device based on determining that the uncertainty is greater than or equal to the uncertainty threshold comprises:
   determining a quantity of the multiple location requests to be provided to the user device based on determining that the uncertainty is greater than or equal to the uncertainty threshold; and
   providing, to a network device, instructions to cause the network device to provide the quantity of the multiple location requests to the user device.

4. The method of claim 3, wherein the multiple location estimates, with the uncertainties, are generated by the user device and received, by the device, from the network device.

5. The method of claim 1, wherein each of the set of weights is larger when a corresponding one of the set of uncertainties is smaller and each of the set of weights is smaller when a corresponding one of the set of uncertainties is larger.

6. The method of claim 1, wherein calculating the set of weights based on the set of uncertainties comprises:
   calculating a reciprocal for each uncertainty of the set of uncertainties to generate a set of reciprocals, wherein the set of reciprocals corresponds to the set of weights.

7. The method of claim 1, wherein calculating the set of weighted location estimates based on the set of weights and the set of location estimates comprises:
   adding values of the set of weights to obtain a total value;
   multiplying weights, of the set of weights, and corresponding location estimates, of the set of location estimates, to generate a set of values; and
   dividing each of the set of values by the total value to calculate the set of weighted location estimates.

8. A device, comprising:
   one or more processors configured to:
      receive a location estimate associated with a user device;
      determine whether an uncertainty associated with the location estimate is greater than or equal to an uncertainty threshold;
      cause a network device to provide multiple location requests to the user device based on determining that the uncertainty is greater than or equal to the uncertainty threshold;
      receive, from the network device, multiple location estimates, with uncertainties, for the user device based on causing the network device to provide the multiple location requests to the user device;
      store the location estimate, the multiple location estimates, and the uncertainties in a data structure;
      identify a greatest uncertainty of the uncertainties;
      remove, from the data structure, one or more location estimates and uncertainties associated with the greatest uncertainty to generate a set of location estimates and a set of uncertainties;
      calculate a set of weights based on the set of uncertainties;
      calculate a set of weighted location estimates based on the set of weights and the set of location estimates;
      calculate a weighted average location of the user device based on the set of weighted location estimates; and
      provide the weighted average location to the user device.

9. The device of claim 8, wherein the one or more processors, to calculate the weighted average location of the user device based on the set of weighted location estimates, are configured to:
   calculate a weighted average latitude based on the set of weighted location estimates;
   calculate a weighted average longitude based on the set of weighted location estimates; and
   calculate the weighted average location of the user device based on the weighted average latitude and the weighted average longitude.

10. The device of claim 8, wherein the one or more processors are further configured
    receive cell identifier and enhanced cell identifier measurements associated with the user device; and
    determine, based on the cell identifier and enhanced cell identifier measurements, whether the user device moved.

11. The device of claim 8, wherein the one or more processors are further configured to:
    receive cell identifier and enhanced cell identifier measurements associated with the user device;
    perform additional checks associated with the user device; and determine, based on the cell identifier and enhanced cell identifier measurements and the additional checks, whether the user device moved to a new location.

12. The device of claim 11, wherein the one or more processors, to perform the additional checks, are configured to one or more of:
   determine whether a new location estimate at the new location has a greater uncertainty than an original location estimate at an original location;
   determine whether a time associated with the user device moving from an original location to the new location is feasible; or
   determine whether the user device changed serving cells.

13. The device of claim 8, wherein the one or more processors are further configured to:
   receive observed time difference of arrival measurements associated with the user device; and
   determine whether an outlier is to be utilized or discarded based on the observed time difference of arrival measurements.

14. The device of claim 13, wherein the outlier is to be discarded based on the user device being associated with common serving cells.

15. A non-transitory computer-readable medium storing a set of instructions, the set of instructions comprising:
   one or more instructions that, when executed by one or more processors of a device, cause the device to:
      receive a location estimate associated with a user device;
      determine whether an uncertainty associated with the location estimate is greater than or equal to an uncertainty threshold; and
      selectively:
         provide the location estimate to the user device based on the uncertainty being less than uncertainty threshold; or
         cause multiple location requests to be provided to the user device based on determining that the uncertainty is greater than or equal to the uncertainty threshold;
         receive multiple location estimates, with uncertainties, for the user device based on causing the multiple location requests to be provided to the user device;
         store the location estimate, the multiple location estimates, and the uncertainties in a data structure;
         identify a greatest uncertainty of the uncertainties;
         remove, from the data structure, one or more location estimates and uncertainties associated with the greatest uncertainty to generate a set of location estimates and a set of uncertainties;
         calculate a set of weights based on the set of uncertainties;
         calculate a set of weighted location estimates based on the set of weights and the set of location estimates;
         calculate a weighted average location of the user device based on the set of weighted location estimates; and
         provide the weighted average location to the user device.

16. The non-transitory computer-readable medium of claim 15, wherein the one or more instructions, that cause the device to cause the multiple location requests to be provided to the user device based on determining that the uncertainty is greater than or equal to the uncertainty threshold, cause the device to:
   determine a quantity of the multiple location requests to be provided to the user device based on determining that the uncertainty is greater than or equal to the uncertainty threshold; and
   provide, to a network device, instructions to cause the network device to provide the quantity of the multiple location requests to the user device,
      wherein the multiple location estimates, with the uncertainties, are generated by the user device and received, by the device, from the network device.

17. The non-transitory computer-readable medium of claim 15, wherein the one or more instructions, that cause the device to calculate the set of weights based on the set of uncertainties, cause the device to:
   calculate a reciprocal for each uncertainty of the set of uncertainties to generate a set of reciprocals,
      wherein the set of reciprocals corresponds to the set of weights.

18. The non-transitory computer-readable medium of claim 15, wherein the one or more instructions, that cause the device to calculate the set of weighted location estimates based on the set of weights and the set of location estimates, cause the device to:
   add values of the set of weights to obtain a total value;
   multiply weights, of the set of weights, and corresponding location estimates, of the set of location estimates, to generate a set of values; and
   divide each of the set of values by the total value to calculate the set of weighted location estimates.

19. The non-transitory computer-readable medium of claim 15, wherein the one or more instructions, that cause the device to calculate the weighted average location of the user device based on the set of weighted location estimates, cause the device to:
   calculate a weighted average latitude based on the set of weighted location estimates;
   calculate a weighted average longitude based on the set of weighted location estimates; and
   calculate the weighted average location of the user device based on the weighted average latitude and the weighted average longitude.

20. The non-transitory computer-readable medium of claim 15, wherein the one or more instructions further cause the device to:
   receive cell identifier and enhanced cell identifier measurements associated with the user device; and
   determine, based on the cell identifier and enhanced cell identifier measurements, whether the user device moved.

* * * * *